July 29, 1952　　　K. J. G. LEUFVENIUS　　　2,604,958
LUBRICATION FITTING
Filed Sept. 15, 1944
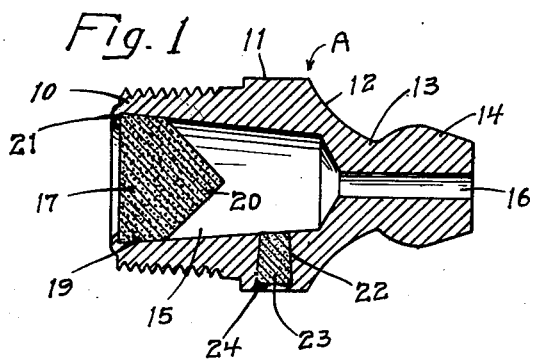
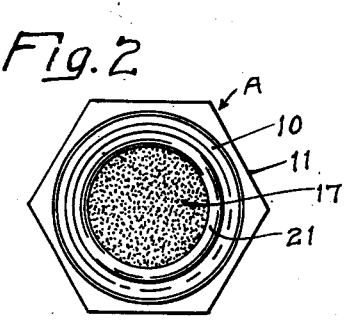
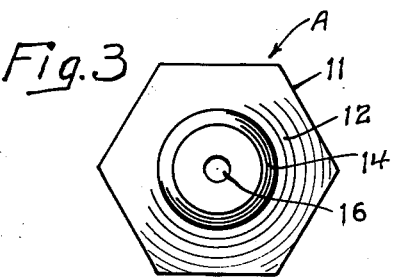
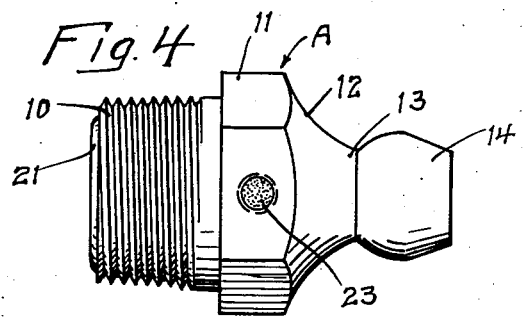
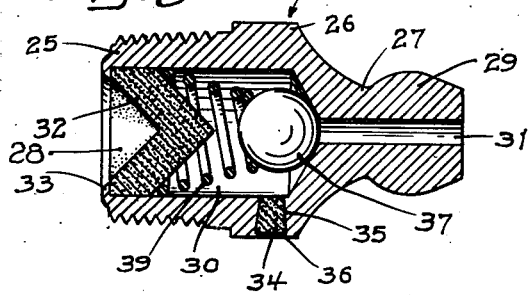
INVENTOR
KARL J. G. LEUFVENIUS
BY Robert M. Dunning
ATTORNEY Patented July 29, 1952

2,604,958

UNITED STATES PATENT OFFICE 2,604,958

LUBRICATION FITTING

Karl J. G. Leufvenius, Minneapolis, Minn.

Application September 15, 1944, Serial No. 554,198

4 Claims. (Cl. 184—105)

My invention relates to an improvement in lubrication fitting and more particularly to a hydraulic fitting equipped with a filtering means.

Various types of grease gun connections commonly known as hydraulic fittings have been manufactured for a number of years. These fittings are ordinarily threaded or pressed into the inlet end of a lubrication duct and serve as a connector to which the end of a grease or lubricating gun may be attached. These fittings are of various sizes and shapes and usually comprise an end which is anchored into the body of the apparatus to be lubricated and have a passage therethrough through which the lubricant may pass. The projecting end or head of the fitting is shaped to accommodate a grease gun or the like. If desired, the fitting head may be shaped to positively interengage with the nozzle of a grease gun. In other instances the fitting head may merely comprise a rounded or ball-shaped outer end against which a socket shaped grease gun nozzle may be pressed.

For numerous years the damage resulting from foreign material in the lubrication of moving members has been recognized. As a result certain mechanisms are now made which are entirely sealed from the atmosphere. Most mechanisms, however, can not be so hermetically sealed and require periodic lubrication. Some fittings are equipped with check valves to maintain pressure in the lubrication duct. Such check valves may help to keep foreign particles out of the lubricating system. Special means have also been provided to clean the heads of the fittings before the lubricant is forced therethrough.

While special oil filters, air cleaners, and other mechanisms have been provided to prevent dust and grit from entering the crank case of internal combustion engines, no satisfactory filtering means has been provided at the inlet of lubrication systems to prevent foreign particles from entering the lubrication ducts. As a result grit, sand, and other foreign particles are often forced into the lubrication line as the grease is forced through the hydraulic fittings. As a result excess wear has occurred on the lubricated parts and the very purpose of lubrication has been to some extent nullified.

It is the object of the present invention to provide a hydraulic fitting with a filter which is capable of standing up under extreme pressure and which will prevent the passage of foreign material into the lubrication line. Attempts have previously been made to insert screens and other such elements in the hydraulic fittings, but the extreme pressure to which these screens are subjected deforms the same after the screens have collected sufficient foreign material.

In order to prevent undue restriction, the diameter of the wire forming the screens should not exceed the width of the screen openings. In a screen of sufficiently fine mesh to filter fine solid particles, the wire must be so small in diameter that much of the strength of the screen is lost. Furthermore, such a fine screen is extremely costly to produce.

It is a feature of the present invention to provide a lubrication fitting with a plug of powdered metal which has been formed under pressure and then sintered at a temperature below the melting point of the metal. The porosity of such a plug may be definitely regulated. Organic material is mixed with the powdered metal before forming, so that when the material is heated, the organic material will gasify and form continuous passages through the plug. The amount or type of this organic material regulates the porosity of the finished product. In any event such a plug is capable of withstanding the pressure to which it is subjected and will not break apart or disintegrate under extreme pressure. The plug is sufficiently porous to prevent the passage of foreign material and will thus prevent any grit or sand from entering the lubrication system to cause excessive wear.

A further feature of the present invention lies in the provision in the preferred form of my invention of a second plug or filter which is provided in a passage from the interior of the hydraulic fitting to the atmosphere. This second plug is formed of powdered metal which is of finer particles than the porous metal filter used at the base of the fitting to filter the lubricant passing into the lubrication system. As a result the lubricant will normally flow through the larger and coarser filter leading to the lubrication system rather than through the finer mesh filter in the side wall of the fitting. However, should the coarser filter become clogged with foreign material so as to prevent the passage of lubricant therethrough, the lubricant under pressure will pass out through the side wall of the fitting where it may be noted by the person applying the grease gun. This second filter thus forms a signal to indicate when the filter of the fitting has become clogged. The fitting should then be replaced, or the filter removed and cleaned. The provision of a second filter also provides a signal when there is sufficient pressure in the lubrication duct; as when sufficient pressure is reached the lubricant will be forced through the second filter.

A feature of the present invention lies in the fact that my filter may be used in conjunction with a check valve if it is so desired. Much of the value of a check valve in the hydraulic fitting is lost by the insertion of the filter. However, should an additional safeguard be desired, it is possible to use the conventional check valve in combination with the filter.

A further feature of the present invention lies in the use in a lubrication fitting of a filter or pressed powdered metal which is substantially conical or partially conical in form. The cone of the fitting is directed toward the inlet to the fitting so as to present a larger area to the material being filtered.

These and other objects and novel features of my invention will be more clearly and fully set forth in the following specification and claims.

In the drawings forming a part of my specification:

Figure 1 is a cross-sectional view longitudinally through a hydraulic fitting showing my invention.

Figure 2 is an elevational view of the outlet end of the hydraulic fitting.

Figure 3 is an elevational view of the inlet end of the same fitting.

Figure 4 is an elevational side view showing the fitting.

Figure 5 is a view similar to Figure 1 showing a check valve embodied in the fitting.

The fitting A, illustrated in Figures 1 through 4 of the drawings, is of generally conventional type and the specific form thereof is illustrative of the adaptation of my filter to a common type of fitting. The specific fitting A illustrated, includes an outlet end 10 which is externally threaded to engage in the end of a lubrication line. In some instances the threads are omitted and the fitting is merely pressed into place.

A hexagonally shaped body portion 11 is provided adjacent the threaded end 10. This hexagonal portion 11 permits the fitting to be engaged by a wrench or the like when screwed into place. Obviously the shape of the body portion 11 may be modified if the threads are omitted.

The body of the fitting curves inwardly at 12 to a narrowed portion 13 and a rounded head 14 emanates therefrom. The rounded head end 14 is adapted to be received in the socket of a grease gun or the like. The shape of the head 14 may be changed to fit the particular type of grease gun nozzle used and may comprise a shape which is known as a button head or pin type if it is so desired.

A tapered socket 15 is provided within the shank end 10 of the fitting. A relatively small diameter orifice 16 extends through the rounded head 14 so as to provide a communication between the socket 15 and the head end of the fitting. Lubricant is forced through the orifice 16 into the enlarged diameter socket 15 which in turn communicates with the lubrication duct in the member to which it is attached.

A plug 17 of powdered metal having preferably, slightly tapered walls 19 and a substantially conical end 20, is inserted within the end of the socket 15. The plug 17 is of proper diameter to fit snugly within the extreme end of the fitting A and longitudinal movement of the plug is limited by the size and shape of the walls of the plug. A shoulder 21 at the outer end of the fitting is formed or clinched over the larger edge of the plug 17 so as to hold this plug from accidental disengagement from the fitting.

Through the side wall of the fitting I provide a tapered opening 22 to accommodate a relatively small diameter filtering plug 23. The filtering plug 23 is formed of finer particles than the filter plug 17 and accordingly is not as porous as the plug 17. The plug 23 is inwardly tapered so that it can not work into the body of the fitting and the edge 24 of the aperture 22 is spun or riveted over the outer end of the plug so as to hold the same in place. The plug is slightly shorter than the aperture 22 or at least the outer end of the plug is spaced inwardly from the outer end of the aperture to permit this clinching action.

The plugs 17 and 23 are formed of powdered metal which is pressed together and sintered at a temperature below the melting point of the metal. The particles of material thus adhere together in a continuous mass but when sintered with organic material as described provide a degree of porosity which permits the lubricant to flow therethrough. Various metals have been used for the purpose, and powdered copper, tungsten, tin and other materials have been used in this manner.

In Figure 5 of the drawings I disclose a modified form of construction in which a check valve has been incorporated. The fitting B is similar in general respects to the fitting A and includes a threaded or pressed fit shank end 25 and a larger diameter hexagonal body 26 adjacent this shank end. The body of the fitting tapers to a small diameter portion at 27 and a rounded head 29 projects therefrom. A socket 30 is provided in the outlet end of the fitting and a communicating passage 31 is provided in the inlet end thereof.

A plug 32 of powdered metal pressed together and sintered at a temperature below the melting point of the metal is disposed in the outer end of the socket 30 and is held in place by a shoulder 33. The plug 32 is provided with a conical recess 28 in its outer end so that the wall thickness of the plug remains substantially constant throughout its area. A second plug 34 of finer powdered metal is provided in an aperture 35 through the side wall of the plug and is held in place by a shoulder 36.

A ball valve 37 is provided within the socket 30 and is held by the spring 39 against the inlet passage 31. As a result the passage 31 is normally closed to the atmosphere but the spring 39 will compress to open this passage when pressure is applied while lubricant is being forced through the passage 31. The plug 32 is held in place against the shoulder 33 by any suitable means, such as by the spring 39.

It often happens that expansion of the lubricant in a sealed bearing, due to heat induced therein by excessive speeds or loads and due to overlubrication, will create a pressure in said bearing to force grease through the sealed ends thereof out into adjacent parts of the machine where it may cause considerable damage or, at least, become a nuisance. In such a case the filter plug 34 or 17 will serve as a relief valve to allow excess pressure to escape at a point where provision may be made to absorb any discharge of grease therefrom. Thus the lubricant is prevented from destroying the seal of sealed bearings.

For certain purposes, plugs of ceramic particles may be used. I have found, however, that such ceramic plugs are inferior to those of powdered metal.

In accordance with the patent statutes, I have described the principles of construction and operation of my oil fitting, and while I have endeavored to set forth the best embodiments thereof, I desire to have it understood that these are only illustrative thereof, and that obvious changes may be made within the scope of the following claims without departing from the spirit of my invention.

I claim:

1. A hydraulic grease coupling comprising a body having a shank end and a head end, a socket in the shank end of said body, a grease passage through the head end of said body communicating with said socket, said socket being tapered and wider at the extreme shank end, a tapered filter plug in said tapered socket, said plug comprising a body of sintered powdered metal having tortuous passages therethrough, and said plug having a conical end thereon directed toward the head end of said body.

2. A hydraulic coupling comprising a body having a shank end and a head end, a socket in the shank end of said body, a passage through the head end of said body communicating with said socket, said socket being tapered and wider at the extreme shank end, a tapered plug in said tapered socket, said plug comprising a porous body of sintered powdered metal having tortuous passages therethrough, an inturned flange on said socket and for holding said plug in place in said socket, and a conical head on said plug directed toward the head end of said socket.

3. A lubrication fitting comprising a body having a shank end and a head end, a socket in the shank end of said body, a passage through the head end of said body communicating with said socket, a porous plug in said socket, said plug comprising a body of sintered powdered metal, and an aperture through the wall of said body communicating with said socket between said passage and said plug, and a porous plug of sintered powdered metal of greater density than said first mentioned plug in said aperture.

4. A lubrication fitting comprising a body having a shank end and a head end, a socket in the shank end of said body, a passage through the head end of said body communicating with said socket, a filter plug in said socket, said plug comprising a body of sintered powdered metal, an aperture through the side wall of said body communicating with said socket between said passage and said plug, and a filter plug of sintered powdered metal of greater density than said first named plug in said aperture, the powdered metal filter plug in said aperture being of less area than the filter plug in said socket.

KARL J. G. LEUFVENIUS.

REFERENCES CITED

The following references are of record in the file of this patent:

UNITED STATES PATENTS

| Number | Name | Date |
| --- | --- | --- |
| 1,061,368 | Gilliam | May 13, 1913 |
| 1,393,097 | Dupre | Oct. 11, 1921 |
| 1,687,780 | Neale | Oct. 16, 1928 |
| 1,732,579 | Gleason | Oct. 22, 1929 |
| 1,947,586 | Fletcher | Feb. 20, 1934 |
| 2,136,170 | Luertzing | Nov. 8, 1938 |
| 2,217,739 | Ehnts | Oct. 14, 1940 |
| 2,232,359 | Barks | Feb. 18, 1941 |
| 2,250,123 | Boehm | July 22, 1941 |
| 2,259,977 | Kelly | Oct. 21, 1941 |
| 2,297,817 | Truxell | Oct. 6, 1942 |

FOREIGN PATENTS

| Number | Country | Date |
| --- | --- | --- |
| 418,730 | Great Britain | Oct. 30, 1934 |